(Model.)
S. B. ROBISON.
TIRE TIGHTENER.
No. 259,588. Patented June 13, 1882.
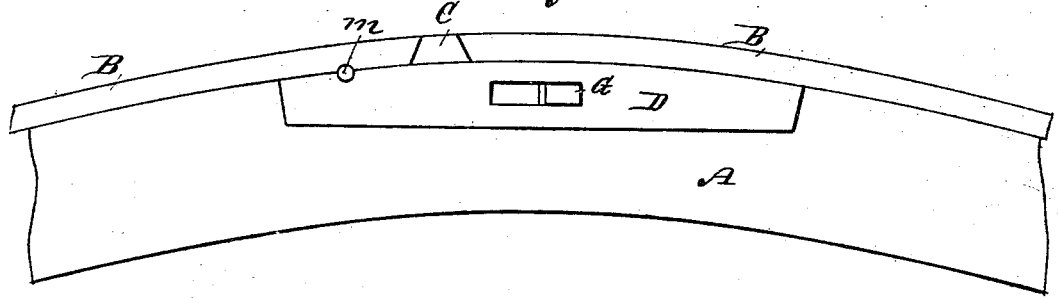
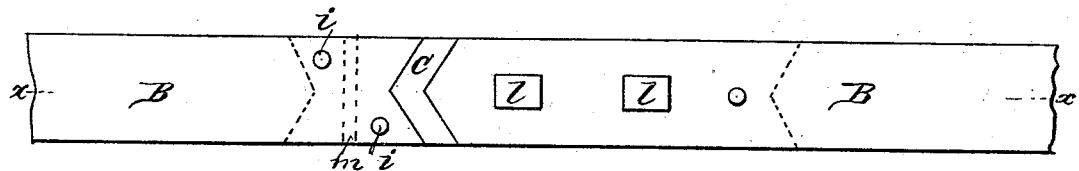
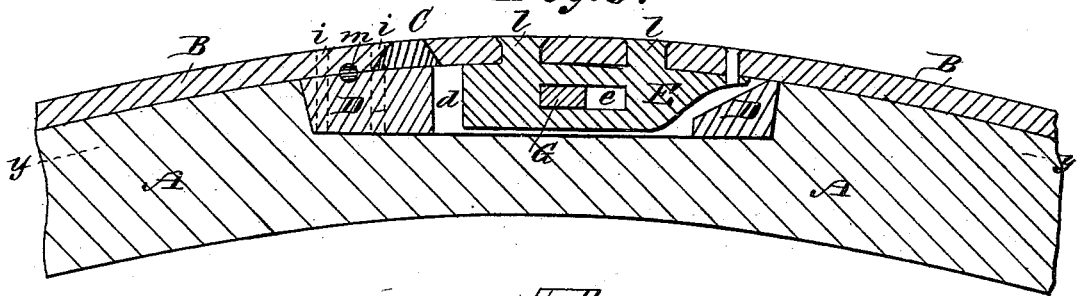
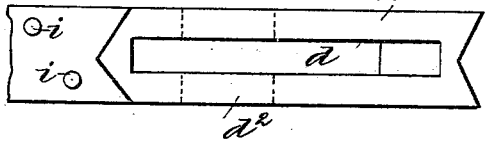
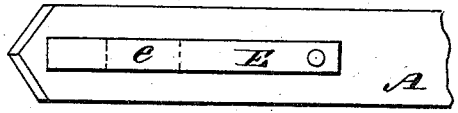
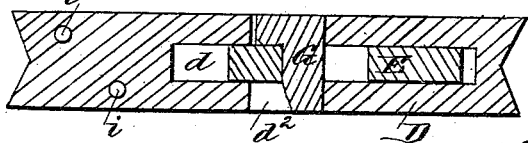
WITNESSES:
Theo. G. Hoster
C. Sedgwick
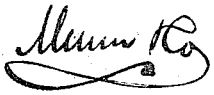
INVENTOR:
S. B. Robison
BY
ATTORNEYS.

UNITED STATES PATENT OFFICE.

SYLVANUS B. ROBISON, OF VALPARAISO, NEBRASKA, ASSIGNOR OF ONE-HALF TO ARTHUR M. WHITE, OF SAME PLACE.

TIRE-TIGHTENER.

SPECIFICATION forming part of Letters Patent No. 259,588, dated June 13, 1882.

Application filed March 21, 1882. (Model.)

*To all whom it may concern:*

Be it known that I, SYLVANUS B. ROBISON, of Valparaiso, in the county of Saunders and State of Nebraska, have invented certain new and useful Improvements in Tire-Tighteners, of which the following is a full, clear, and exact description.

My invention relates to a means for tightening the tire of a vehicle-wheel when the wooden fellies have become shrunk and contracted in consequence of age and dryness.

The invention consists in a novel construction and combination, with the tire and one of the fellies, of an iron felly-section secured to the wooden felly, and to a portion of the tire, and provided with a longitudinal slot, a staple or slotted bar attached to another portion of the tire and working in said longitudinal slot, and a wedge or key working in the slot of said staple or bar and in a slot intersecting said longitudinal slot, whereby provision is made for tightening the tire by driving home the wedge or key, as hereinafter more particularly described.

Reference is to be had to the accompanying drawings, forming part of this specification, in which similar letters of reference indicate corresponding parts in all the figures.

Figure 1 is a side view of my invention. Fig. 2 is a peripherical view of the same. Fig. 3 is a longitudinal section taken in the line $x$ $x$ of Fig. 2. Figs. 4, 5, 6, and 8 are detail views. Fig. 7 is a longitudinal section taken in line $y$ $y$ of Fig. 3.

A represents a wooden felly of any suitable description.

B is the tire, the ends of which approach each other, but do not actually meet. At one end of the tire is a V-shaped notch, and at the other end is a correspondingly-shaped point, and both the notch and point are beveled inwardly toward the periphery of the felly.

C is a block or piece of iron corresponding in width with the width of the tire and felly and having a notch at one end and a point at the other, beveled outwardly toward the periphery of the tire, so as to fit snugly between the notched and pointed ends of the tire.

D is an iron felly-section, in the form of a segment of a circle, and of a width corresponding with that of the felly and tire. It is provided with a longitudinal slot, $d$, extending for somewhat more than half its length in a direction parallel with the plane of revolution of the wheel, and a shorter longitudinal slot $d^2$, about midway of its length, parallel with the axis of revolution.

E is a staple or slotted bar, having a longitudinal slot, $e$, corresponding with the slot $d^2$ of the felly-section D.

G is a key having a tapering or wedge-shaped shank, $g$, and a head, $g^2$, at a right angle thereto.

The operation of my invention is as follows: The felly-section D is attached to one end of the tire B by bolts $i$, and rests in a recess provided for it in the wooden felly A, and the staple or slotted bar E is attached to the other end of the tire. The block C is placed in position between the ends of the tire, and the staple or slotted bar E is inserted in the slot $d$. The key G is then inserted in the slots $d^2$ and $e$, and the tire is tightened by driving home the wedge and upsetting its point.

As the tire becomes more and more loose from age and dryness of the wooden fellies, wider keys G and narrower blocks C are employed, and this action may be reversed if it is desired to loosen the tire in consequence of swelling or expansion of the wood from wet or moisture.

The advantages of my invention are: It can be readily adjusted by any person so as to either tighten or loosen the tire, and thus the many well-known inconveniences arising from either loose or tight tires may be avoided.

Having thus fully described my invention, what I claim as new, and desire to secure by Letters Patent, is—

1. In a tire-tightener, the combination, with the recessed wooden felly A and the tire B, of the iron felly D, secured to one end of the tire and provided with the slots $d$ $d^2$, the staple or bar E, secured to the other end of the said tire and provided with the slot $e$, and the wedge or key G, substantially as and for the purpose set forth.

2. The combination, with the tire B, having its ends notched and pointed and beveled inward, of the block C, having its ends notched and pointed and beveled outward, substantially as herein described.

3. In a tire-tightener, the combination, with the recessed wooden felly A and the tire B, having its ends notched and pointed and beveled inward, of the notched and pointed beveled block C, the iron felly D, provided with the slots $d\ d^2$, and the staple or bar E, provided with the slot $e$, and the wedge G, substantially as and for the purpose set forth.

SYLVANUS BREEDFIELD ROBISON.

Witnesses:
BENJ. F. HEDGERS,
ARTHUR M. WHITE.